United States Patent [19]
Johnson et al.

[11] 4,069,908
[45] Jan. 24, 1978

[54] SIDE PUSH DIVIDER

[75] Inventors: Lloyd Douglas Johnson; Kenneth Ernest Kroeber, both of Portland, Conn.

[73] Assignee: Emhart Industries, Inc., Farmington, Conn.

[21] Appl. No.: 702,713

[22] Filed: July 6, 1976

[51] Int. Cl.² .............................................. B65G 47/84
[52] U.S. Cl. ................................... 198/437; 198/440; 198/856
[58] Field of Search .............................. 198/364–367, 198/427, 436, 437, 440, 441, 856

[56] References Cited

U.S. PATENT DOCUMENTS

| 2,868,394 | 1/1959 | Greller et al. | 198/367 |
| 3,204,752 | 9/1965 | Conner | 198/437 |
| 3,255,863 | 6/1966 | Homan | 198/440 |
| 3,735,867 | 5/1973 | Vanderhoof et al. | 198/367 |
| 3,771,648 | 11/1973 | Revuelta | 198/440 |
| 3,791,518 | 2/1974 | Vanderhoof | 198/440 |

Primary Examiner—John J. Love
Assistant Examiner—Jeffrey V. Nase
Attorney, Agent, or Firm—McCormick, Paulding & Huber

[57] ABSTRACT

Objects moving single file on an infeed conveyor are diverted onto an intermediate conveyor where they are separated, and then sequentially pushed onto a wider take away conveyor having lane defining means for receiving the objects in discrete lanes. A side push conveyor has an upper run which moves at a speed related closely to that of the intermediate conveyor, and has cam operated slats or pushers which cooperate to define pockets for urging the objects off the intermediate conveyor onto the take away conveyor and into the appropriate lanes.

16 Claims, 9 Drawing Figures

U.S. Patent   Jan. 24, 1978   Sheet 1 of 2   4,069,908
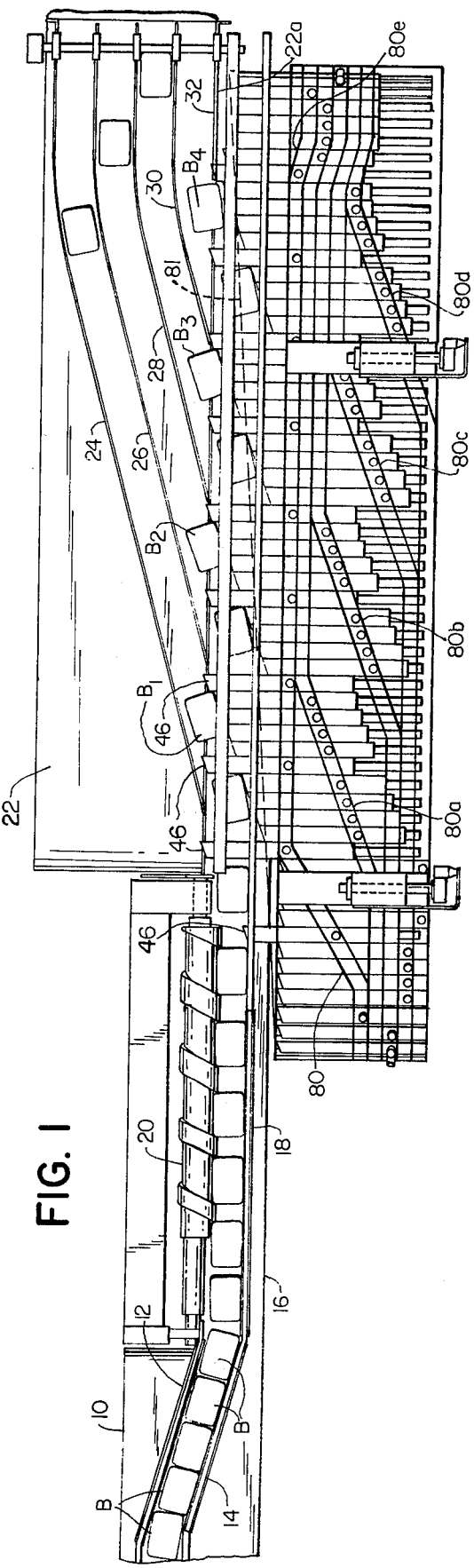
FIG. 1
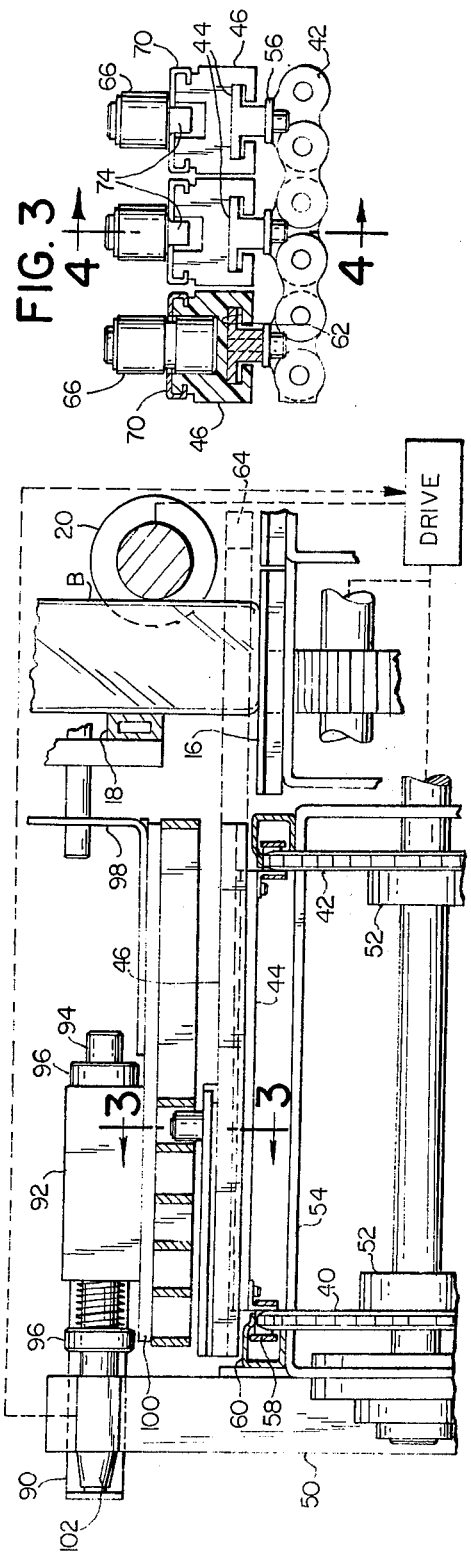
FIG. 3
FIG. 2

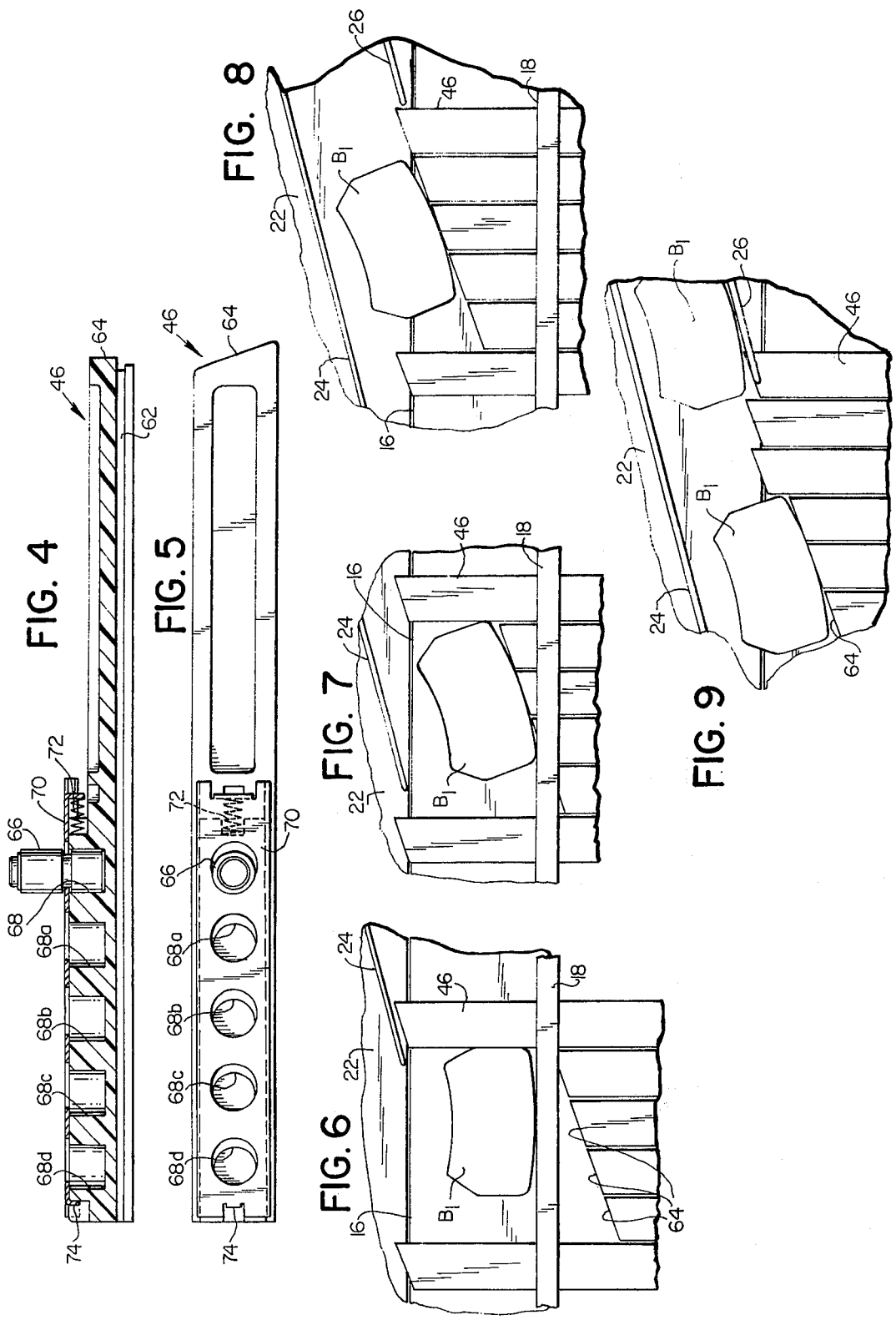

SIDE PUSH DIVIDER

This invention relates generally to dividers of the type wherein a single file or column of objects is split into several discrete lanes on a take away conveyor, for convenience in packaging or handling of the objects.

More specifically, this invention has as its general object the diverting of irregularly shaped objects from a column or single file configuration on a conveyor by means of a side push conveyor provided alongside the column such that the objects are smoothly pushed laterally into side openings defining the various inlets of a plurality of lanes on a take away conveyor.

The side push conveyor has grouped pushers so arranged that a cam track defining superstructure above the pushers operates the pushers sequentially so that the objects are rotated slightly as they are pushed into the lane openings in order to facilitate handling of objects such as bottles having a cross sectional shape characterized by a major axis of somewhat greater dimension than its minor axis.

The cam track superstructure is so mounted that jamming of an object will cause the cam track defining superstructure to move against a preset biasing force and thereby trip a switch shutting down at least the side push conveyor, and at the same time relieving stresses on the jammed object as a result of the resilient mounting for the superstructure.

The apparatus disclosed is so designed that it can be set up for either right hand or left hand dividing, and also for use in a double system wherein two columns of single file objects are to be divided in synchronism.

Each group of pushers on the side push conveyor has an associated cam track defined in the superstructure and the number of pushers in each group can be varied to handle objects of various size. In addition, each pusher has a cam follower associated therewith, the lateral position of which cam follower can be varied in its associated pusher in order to provide a convenient means for adjusting the side push motion of the pusher elements.

A guide pusher or divider is preferably provided in association with each group of pushers to define a pocket for one or more of the objects being handled, and such guide pusher serves to control the position of the object on the underlying or intermediate conveyor merely by operating the underlying conveyor at a speed related to that of the side push conveyor with the result that the object is continually urged against the trailing edge or leading edge of one of the guide pushers associated with a particular pocket.

The intermediate conveyor provides a convenient means for defining a path for the objects not only as they are separated by a worm or screw but also provides a convenient path for the objects as they are fed in spaced relationship alongside the take away conveyor. The side push conveyor is provided opposite the path defining means and also moves in the same direction. Transversely oriented tracks on the side push conveyor carry pushers which are slidably mounted in the tracks for transverse movement in response to the action of a superstructure located above the side push conveyor and defining a plurality of cam tracks for moving cam followers associated with the pushers. The free ends of the pushers project over the path defining means or at least that portion adjacent the longitudinal side edge of the take away conveyor, and serve to urge the objects laterally off the intermediate conveyor into side openings or inlets for discrete lanes on the take away conveyor.

BRIEF DESCRIPTION OF THE DRAWINGS

FIG. 1 is a plan view of a side push divider system constructed in accordance with the present invention.

FIG. 2 is an elevational view illustrating the side push conveyor in greater detail, being drawn to somewhat larger scale than FIG. 1, and illustrating also the limit positions of the pushers themselves, the fully extended position thereof being shown in broken lines.

FIG. 3 is a vertical sectional view taken generally on the line 3—3 of FIG. 2 but with portions of the cam track defining superstructure and other fixed structure being deleted in order to better reveal the construction of the pushers and the associated conveyor chain to which they are attached.

FIG. 4 is a sectional view taken generally on the line 4—4 of FIG. 3 but with the chain eliminated.

FIG. 5 is a plan view of the pusher illustrated in FIG. 4.

FIGS. 6, 7, 8 and 9 illustrate the turning action achieved on the object as a result of the side pushing action of one group of pushers as the object is urged into an associated lane on the take away conveyor.

DETAILED DESCRIPTION

Turning now to the drawings in greater detail, FIG. 1 shows an infeed conveyor 10 upon which objects, such as glass bottles B, B are fed continuously in a single file column from left to right, that is in the direction of the conveyor 10. These objects are diverted, by means of guides 12 and 14, onto an adjacent intermediate conveyor 16. A guide bar 18 is provided above the intermediate conveyor 16 and opposite this guide bar 18 a screw or bottle separator 20 is rotated so as to separate the objects slightly in order to facilitate the dividing of the objects by the structure to be described, whereby the objects are fed into lanes defined on a take away conveyor 22.

Still with reference to FIG. 1 the take away conveyor 22 is provided generally in line with the infeed conveyor 10 but is separated therefrom and adapted to receive the divided objects along one marginal side 22a of the take away conveyor, and more particularly between lane defining guides indicated generally at 24, 26, 28, 30 and 32. These lane defining guides are open laterally onto the intermediate conveyor 16 so as to receive the objects B, B fed laterally therebetween by the side push divider to be described. More particularly, certain of these articles, as shown those indicated by the reference numeral B1, are fed into the first lane defined by the guides 24 and 26. The articles B2 are fed between the second lane defining guides 26 and 28, and the third lane defining structure 28 and 30 receives the articles B3, the final lane defining structure 30, 32 receiving the fourth group of objects B4.

The intermediate conveyor 16, in cooperation with the guide 18, defines a path for the objects in order to feed the objects in spaced relationship downstream, and a portion of said path is oriented longitudinally alongside the take away conveyor 22 and more particularly alongside the marginal edge 22a. The screw 20, the intermediate conveyor 16, and the side push conveyor (to be described) are preferably operated in timed relationship to one another from a drive motor as indicated in FIG. 2.

Turning next to a more complete description of the side push conveyor structure shown in FIG. 1, said side push conveyor includes upper and lower runs (the upper run being shown in FIG. 1) and comprises a pair of laterally spaced chains 40 and 42, best shown in FIG. 2, which chains carry individual T-shaped rails or tracks 44, 44 best shown in FIG. 3. Thus, the tracks 44, 44 travel downstream in the same direction as the bottles on the conveyor 16 and the lineal speed of these tracks 44, 44 is preferably slightly less than that of the conveyor 16, and hence of the bottles B, B, with the result that these bottles tend to run up against the projecting pushers 46, 46. All of the pushers are slidably received on the tracks 44, 44 as best shown in FIG. 3, and these pushers 46, 46 are adapted and arranged to engage the bottles B, B in order to move the bottles laterally off the conveyor 16 into the open ends of the lane defining structure described above as the side push conveyor of FIG. 2 is operated in the manner to be described.

Fixed support structure is provided for the side push conveyor in the form of uprights or posts one of which is indicated generally in FIG. 2 at 50. Drive means is provided as indicated in FIG. 2 for rotating sprockets 52, 52 in order to drive the chains 40 and 42 mentioned previously, and an inverted channel 54 supports the upper run of the conveyor chain for movement in the downstream direction as described. The transversely extending tracks 44, 44 are of generally T-shape as mentioned, and as best shown in FIG. 3, and each of them is supported on a horizontally extending flange of a small bracket 56. A depending flange of the bracket 56 is riveted to the links of the roller chain. The rollers themselves, best shown in FIG. 2 at 58, are entrained in a channel 60 so that the entire upper run of the side push conveyor is supported for movement in a horizontal plane, and more particularly in the same horizontal plane as that of the upper run for the conveyor 16 described above. The latter conveyor 16 is of conventional construction and need not be described in detail herein.

The individual pushers associated with the side push conveyor are each of identical construction and one of these is shown in detail in FIGS. 4 and 5. Each pusher 46 comprises an injection molded plastic component of low friction material and has a low surface defining a slot (best shown in FIG. 3 at 62) so that the pusher is slidably received on its associated T-shaped track 44. The free end 64 of each pusher is canted, as best shown in FIG. 5, and each of the individual pushers are similarly constructed as best shown in FIG. 1. This configuration is adopted for the pushers in order to achieve the desired turning action of the object as it is pushed off the conveyor 16 into its associated lane defining structure on the take away conveyor 22.

Each of the pushers 46 has an associated cam follower 66 projecting upwardly therefrom and adapted to being received in a cam track to be described. The individual cam followers associated with each of the pushers 46 may be provided in any one of five different sockets in the associated pusher and as shown in FIG. 4 the cam follower 66 is provided in the socket 68, and therefore the pusher 46 of FIG. 4 corresponds to the guide pusher, or divider series of pushers illustrated in FIG. 1 as defining the boundry between adjacent pockets on the side push conveyor. However, it should be noted that the pusher 46 of FIG. 4 could be adapted for use in any one of the positions provided on the side push conveyor itself merely by repositioning the cam follower 66 in one of the other four sockets provided for it. For example, relocating the cam follower 66 into the next adjacent socket would result in a location suitable for use of that pusher in diverting objects into the first lane defining opening associated with the take away conveyor 22 and illustrated by the location for the objects B1 in FIG. 1. Means is provided for releasably retaining the cam follower 66 in one of these sockets and preferably said means comprises a spring biased retainer or plate 70 having a plurality of openings which are alignable with the socket openings in the pusher 46 as a result of sliding the plate 70 to the left as shown in FIGS. 4 and 5, thereby allowing for removal or insertion of the cam follower 66 in one of the associated sockets. A spring 72 biases the retainer 70 toward the right as viewed in FIGS. 4 and 5 to engage an annular slot provided for this purpose in the cam follower roller 66. A tang 74 provided on the left hand end of the retainer 70 prevents the retainer 70 from moving any farther to the right than is shown for it in FIGS. 4 and 5 even when a cam follower 66 is not so held in an associated socket.

Still with reference to the side push conveyor, superstructure is provided above the path of movement for the cam follower rollers and preferably said superstructure defines a plurality of cam tracks best shown in FIG. 1 at 80a, 80b, 80c and 80d, which tracks are adapted to engage the cam followers and to cause lateral or transverse movement of the pushers in response to downstream movement of the pushers and their associated tracks all in timed relationship with movement of the objects on the conveyor 16. More particularly, the inclined cam track 80 associated with the guide pushers or dividers 46, 46 operates on the cam followers of the guide pushers 46, 46 in timed relationship with the pitch of screw conveyor 20 so that the objects B, B are fed between these guides pushers 46, 46 and so that the faster running conveyor 16 urges these objects against the trailing edge of said guide pushers or dividers as best shown in FIG. 1, and as shown in detail in FIGS. 6 through 9. As the end of the guide pusher 46 moves out in front of an object, opposite the screw 20, the object will be guided as it leaves the screw 20 and is carried downstream by the conveyor 16 in one of the pockets defined by the side push conveyor. The object will engage the trailing edge of the guide pusher 46, as best shown in FIG. 6 and be controlled thereby when conveyor 16 is driven slightly faster than the side push conveyor. As the object B moves downstream, the canted end 64, 64 of the pushers in each associated group will engage the object B and turn it slightly on the conveyor 16 as best shown in FIG. 7. FIG. 8 shows the configuration of the pushers when the guide pusher 46 is located adjacent the upstream end of the lane defining fence 26. The canted ends 64, 64 of all the pushers in that pocket are aligned with one another at this point.

The guide pushers do extend slightly over the longitudinal marginal side edge portion of the conveyor 22 as shown in FIGS. 6, 7 and 8 and it is further noted that all of the pushers will move out to overlap this edge 22a as they reach the end of the conveyor 16. FIG. 9 shows this limit position for several of these pushers.

The objects B, B are therefore efficiently handled, and will enter the appropriate lane defining structure and will be turned slightly so as to be properly aligned with an associated lane as best shown in FIG. 8. Finally, the bottle or object B is under the control of the take away conveyor 22, in its associated lane, and the pushers will have ceased to have an effect on the object as the various pushers pass downstream beyond the downstream end of the conveyor 16. With particular reference now to FIG. 1, the pushers will be retracted slightly, as indicated generally by the return angle for the cam track structure indicated generally at 80e in FIG. 1, and the pushers will pass around the downstream sprockets of the side push conveyor. The pushers are returned to their initial positions, best shown at the upstream end of the side push conveyor, in order to be received in the cam tracks defined for them in the superstructure, as indicated generally at 80-80d by a fixed camming or plow means shown in broken lines in FIG. 1 at 81, and located below the lower return run of the side push conveyor. This elongated plow 81 is adapted to fully retract all of the pushers, including the guide pushers, in order that their associated cam follower rolls are received in the proper cam tracks provided for them in the superstructure just described.

Still with reference to the cam track defining superstructure it should be noted that means is provided for yieldably mounting said superstructure to the fixed support structure associated with the side push conveyor. Preferably, said means comprises a pair of blocks 92, 92 one of which is shown in FIG. 2 having a shaft 94 slidably received in the block, and a spring to urge the block toward the right and against the other collar as shown in FIG. 2 (and toward the take away conveyor 22 in FIG. 1). The force on the spring is such that a projecting flange on an angle bracket 90 mounted to the block 92, is adapted to hold a limit switch 102 closed, allowing the side push conveyor, the screw conveyor and the intermediate conveyor 16 to be driven as indicated. However, if a bottle becomes jammed, instead of being pushed smoothly into an associated lane, the pushers will tend to exert a reactive force on the cam track superstructure, with the result that the spring will be compressed, as the block 92 moves toward the left in FIG. 2, and switch 102 will open interrupting power to at least the drive system for the side push conveyor and the screw conveyor.

As mentioned previously, two such yieldable supports are provided for the cam track superstructure, and additional supports in the form of slide shafts 100, 100 may be provided to help support said superstructure.

The drawings herein illustrate the conveyor 16 operated at a slightly faster speed than that of the side push conveyor, and as so operated the bottles are guided by the trailing edge of an associated guide pusher. It will be apparent that operating the conveyor 16 at a speed slightly slower than that of the side push conveyor will result in guiding of the bottles by the leading edge of the following guide pusher. In fact, even if the relative speeds are the same, the bottles will be guided between these guide pushers and in an associated pocket.

We claim:

1. In an apparatus for dividing irregularly shaped objects from single file configuration into discrete lanes on a take away conveyor, the improvement comprising
   a. means defining a path for the objects and for feeding them in spaced relationship, at least a portion of said path being oriented longitudinally alongside the take away conveyor,
   b. side push conveyor means on the opposite side of said longitudinal path defining means from the take away conveyor and movable in said longitudinal direction,
   c. transversely oriented tracks on said side push conveyor, and pushers slidably mounted in said tracks for transverse movement in said tracks, said pushers having upwardly projecting cam followers associated therewith,
   d. superstructure above said side push conveyor means, and defining a plurality of cam tracks for moving said cam followers diagonally to cause the ends of said pushers to project over said path defining portion,
   e. fixed side push conveyor support structure including means for yieldably mounting said superstructure thereto and allowing limited transverse movement of said superstructure relative to said fixed support structure, and
   f. switching means operated by said transverse movement of said superstructure, said switching means serving to shut down at least said side push conveyor in response to transverse movement of said superstructure in a direction away from said longitudinal path.

2. The combination defined in claim 1 wherein said means defining said path for feeding the objects in spaced relationship to one another includes a rotating screw for engaging the articles between its convolutions to separate them by a predetermined distance, and an intermediate conveyor alongside said side push conveyor.

3. The combination defined in claim 2 wherein said means defining said path and for feeding the objects in spaced relationship to one another further includes a longitudinally extending guide rail spaced from said screw and extending downstream parallel said longitudinal direction of said side push conveyor and spaced slightly above said pushers.

4. The combination defined in claim 3 wherein said side push conveyor includes a return run for said side push conveyor tracks and pushers, and camming means associated with said return run for returning said pushers to positions wherein the cam followers can be received in their associated cam tracks defined in said superstructure.

5. The combination defined in claim 1, and said means defining said path for feeding objects in spaced relationship to one another including an intermediate conveyor alongside said side push conveyor, said tracks and associated pushers are arranged in groups, and each group having an associated cam track defined in said superstructure for receiving said cam followers associated with said pushers in said each group, and a guide pusher associated with each group, said guide pushers having their associated cam followers entrained in a cam track so defined in said superstructure that said guide pushers project beyond said pushers 6. The combination defined in claim 5 further characterized by lane defining structure for said take away conveyor, said lane defining structure providing openings for receiving objects pushed therein by said pusher groups, said cam tracks being so located in said superstructure that the ends of the pushers are aligned with the downstream side of the openings in said lane defining structure as the objects move off the intermediate conveyor onto the take away conveyor, and the end of each of said guide pushers is also diagonally oriented and alignable with the ends of said pushers in an associated group at least when said guide pushers is located adjacent the upstream end of the lane defining structure.

7. The combination defined in claim 1 wherein said transverse tracks on said side push conveyor comprise T-shaped rails, and said side push conveyor comprising spaced chains having fittings attaching said T-shaped rails or tracks to said chains, said pushers having complementary T-shaped slots and being fabricated from a material with low frictional characteristics, said pushers provided in closely spaced relationship to one another at least within each group.

8. The combination defined in claim 7 wherein each pusher has a plurality of transversely spaced openings, and means for releasably mounting said cam followers in any one of said pusher openings.

9. The combination defined in claim 8 wherein said means for mounting said cam followers in said pusher openings comprises a retainer plate slidably carried by said pusher, each of said cam followers comprising a plug adapted to be received in one of said pusher openings and in one of several openings in said retainer plate, and means biasing said plate toward a position for engaging the follower plug to hold the plug in an associated opening.

10. In an apparatus for dividing irregularly shaped objects from single file configuration into discrete lanes on a take away conveyor, the improvement comprising
 a. means defining a path for the objects and for feeding them in spaced relationship, at least a portion of said path being oriented longitudinally alongside the take away conveyor,
 b. side push conveyor means on the opposite side of said longitudinal path defining means from the take away conveyor and movable in said longitudinal direction,
 c. transversely oriented tracks on said side push conveyor, and pushers slidably mounted in said tracks for transverse movement in said tracks, said pushers having upwardly projecting cam followers associated therewith,
 d. superstructure above said side push conveyor means, and defining a plurality of cam tracks for moving said cam followers diagonally to cause the ends of said pushers to project over said path defining portion,
 e. fixed side push conveyor support structure including means for yieldably mounting said superstructure thereto and allowing limited transverse movement of said superstructure relative to said fixed support structure, and
 f. said means defining said path for feeding objects in spaced relationship to one another including an intermediate conveyor alongside said side push conveyor,
 g. said tracks and associated pushers are arranged in groups, and each group having an associated cam track defined in said superstructure for receiving said cam followers associated with said pushers in said each group, and a guide pusher associated with each group, said guide pushers having their associated cam followers entrained in a cam track so defined in said superstructure that said guide pushers project beyond said pushers in said associated group so that one side edge thereof will guide the objects during at least a segment of the path of the objects on said intermediate conveyor.

11. The combination defined in claim 10 wherein switching means is operated by said transverse movement of said superstructure, said switching means serving to shut down at least said side push conveyor and said rotating screw in response to transverse movement of said superstructure in a direction away from said longitudinal path.

12. The combination defined in claim 10 further characterized by lane defining structure for said take away conveyor, said lane defining structure providing openings for receiving objects pushed therein by said pusher groups, said cam tracks being so located in said superstructure that the ends of the pushers are aligned with the downstream side of the openings in said lane defining structure as the objects move off the intermediate conveyor onto the take away conveyor.

13. The combination defined in claim 12 wherein the ends of said pushers in each group are diagonally oriented and are diagonally aligned with one another at least when their associated cam followers are in that portion of their associated cam track which is adapted to move said pushers diagonally.

14. The combination defined in claim 10 wherein said transverse tracks on said side push conveyor comprise T-shaped rails, and said side push conveyor comprising spaced chains having fittings attaching said T-shaped rails or tracks to said chains, said pushers having complementary T-shaped slots and being fabricated from a material with low frictional characteristics, said pushers provided in closely spaced relationship to one another at least within each group.

15. The combination defined in claim 14 wherein each pusher has a plurality of transversely spaced openings, and means for releasably mounting said cam followers in any one of said pusher openings.

16. The combination defined in claim 15 wherein said means for mounting said cam followers in said pusher openings comprises a retainer plate slidably carried by each pusher, each of said cam followers comprising a plug adapted to be received in one of said pusher openings and in one of several openings in said retainer plate, and means biasing said plate toward a position for engaging the follower plug to hold the plug in an associated opening.

* * * * *

UNITED STATES PATENT OFFICE
CERTIFICATE OF CORRECTION

Patent No. 4,069,908            Dated January 24, 1978

Inventor(s) Lloyd Douglas Johnson and Kenneth Ernest Kroeber

It is certified that error appears in the above-identified patent and that said Letters Patent are hereby corrected as shown below:

Col. 3, line 46, "low" second occurrence should be -- lower --.

Col. 6, line 57, after "pushers" insert:

--in said associated group, and said intermediate conveyor operated at a speed which is closely related to that of said side push conveyor so that said guide pushers will guide the objects during at least a segment of the path of the objects on the intermediate conveyor.--

Signed and Sealed this

Twentieth Day of June 1978

[SEAL]

*Attest:*

RUTH C. MASON
*Attesting Officer*

DONALD W. BANNER
*Commissioner of Patents and Trademarks*